US010601671B1

(12) United States Patent
Oren et al.

(10) Patent No.: US 10,601,671 B1
(45) Date of Patent: *Mar. 24, 2020

(54) CREATING AND DISPLAYING A GRAPH REPRESENTATION OF A COMPUTER NETWORK TOPOLOGY FOR AN EXECUTING APPLICATION

(71) Applicant: LogicMonitor, Inc., Santa Barbara, CA (US)

(72) Inventors: Gadi Oren, Cambridge, MA (US); Ran Gilboa, Cambridge, MA (US)

(73) Assignee: LogicMonitor, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,398

(22) Filed: Aug. 16, 2019

Related U.S. Application Data

(63) Continuation of application No. 16/219,817, filed on Dec. 13, 2018, now Pat. No. 10,425,290.

(51) Int. Cl.
*H04L 12/24* (2006.01)
*G06F 9/455* (2018.01)
*H04L 12/751* (2013.01)

(52) U.S. Cl.
CPC .......... *H04L 41/12* (2013.01); *G06F 9/45558* (2013.01); *H04L 41/22* (2013.01); *H04L 45/02* (2013.01); *G06F 2009/45595* (2013.01)

(58) Field of Classification Search
CPC .......... H04L 43/00; H04L 67/22; H04L 47/20
USPC ...................................................... 709/224
See application file for complete search history.

(56) References Cited

U.S. PATENT DOCUMENTS

| | | | |
|---|---|---|---|
| 6,654,803 B1 * | 11/2003 | Rochford | H04L 41/22 345/418 |
| 8,826,032 B1 * | 9/2014 | Yahalom | H04L 43/0817 713/187 |
| 2003/0009547 A1 * | 1/2003 | Benfield | H04L 41/0233 709/223 |

(Continued)

OTHER PUBLICATIONS

World International Property Organization, International Search Report and Written Opinion received for International Application No. PCT/US2019/056583, dated Dec. 12, 2019, 11 total pages.

*Primary Examiner* — Mahran Y Abu Roumi
(74) *Attorney, Agent, or Firm* — SoCal IP Law Group LLP; Steven C. Sereboff; Angelo Gaz

(57) ABSTRACT

There are disclosed devices, system and methods for creating and displaying a graph representation of a topology of a computer network of physical network objects for an application. A first physical network object selects portions of sets of data messages being sent over a period of time by the application and related network objects; and collects network configuration and time dimension information from the portions of messages. A second physical network object receives the information and uses it to determine topology information for the application over time, which includes unique keys of, types of objects of, types of relationships between pairs of, groupings of, metrics data of, and time dimension data for the physical network objects. The topology information is stored and queried at the second object to create and display various graph representations of the topology information as it changes over time.

16 Claims, 7 Drawing Sheets

(56) References Cited

U.S. PATENT DOCUMENTS

| | | | | |
|---|---|---|---|---|
| 2007/0268294 A1* | 11/2007 | Eagen | .................... | H04L 41/12 |
| | | | | 345/474 |
| 2015/0127340 A1* | 5/2015 | Epshteyn | ................ | G10L 15/26 |
| | | | | 704/235 |
| 2018/0176261 A1* | 6/2018 | Bansal | .................. | H04L 63/205 |

* cited by examiner

US 10,601,671 B1

CREATING AND DISPLAYING A GRAPH REPRESENTATION OF A COMPUTER NETWORK TOPOLOGY FOR AN EXECUTING APPLICATION

RELATED APPLICATION INFORMATION

This patent application is a continuation of and claims priority from U.S. patent application Ser. No. 16/219,817, entitled "CREATING AND DISPLAYING A GRAPH REPRESENTATION OF A COMPUTER NETWORK TOPOLOGY FOR AN EXECUTING APPLICATION" filed Dec. 13, 2018, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to creating and displaying a graph representation of a computer network topology for an executing application.

Description of the Related Art

Current computer network topology mapping tools or devices are generally unable to automatically create and display a graph representation of the topology of network objects of a network communicating with an application at a large scale. Some such tools do not perform repeated creating and displaying of a graph representation that compares changes, addresses large scale and deals with missing critical data. Some do not automatically create and display a graph representation having group resources (like a cluster or a service) or critical metrics for each network object. Such tools also do not provide a graph representation of the topology that mixes data that is not pure graphical and/or that has data with time dimension.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Technologies described herein provide systems and methods for creating and displaying a graph representation over time of a topology of network objects of a selected application executing on a computer communication network. The system may be an efficient information technology (IT) graph engine existing in one or two physical network objects of the computer network that use topology information determined based on information collected by accessing the network object on which the application is executing. Herein, a network "topology" may be or include the network's "topology information." Herein, "displaying a graph representation" may include generating (e.g., creating) and displaying the graph representation.

Description of Apparatus

Figure 1:
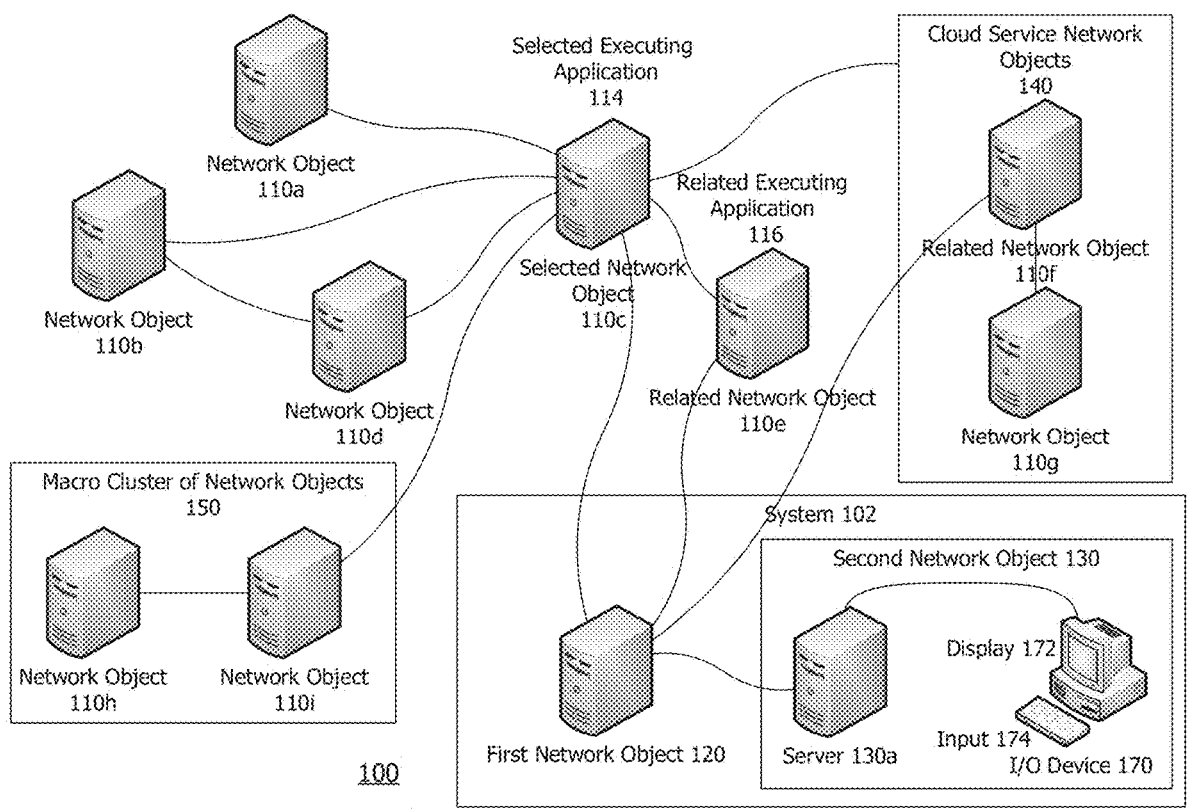
FIG. 1 is a computer communication network having a system for creating and displaying of a graph representation over time of topology information for a selected application executing on a selected network object.

Referring now to FIG. 1, there is shown a computer communication network 100 having a system 102 for continual automated discovering over time of topology information; and/or displaying a graph representation of that topology information of network objects for a selected application 114 executing on a selected network object 110c. In some cases, the "discovering" of topology information also includes some manual intervention to input part of the topology information of one or more network objects. The computer communication network 100 is a computer network or network that includes the network objects 110a-110i, 120 and 130. The software application 114 is executing or running on the network object 110c. The related executing application 116 is executing or running on the network object 110e. The network objects 110a, 110b, 110d, 110c and 110e are independent or stand-alone network objects. The network objects 110f and 110g are part of a cloud service network objects 140. The network objects 110h and 110i are part of macro-components or a cluster group of network objects 150.

Each of the network objects 110a-110i, 120 and 130 may be a physical network object, a virtual network object or another network element. Any number of those network objects are related to the application 114 such as by influencing the execution of, receiving data from and/or sending data to the application 114. A physical network object or a type of physical network object is at least one of a physical host, a physical disk (e.g., within a server or attached to a server in a cloud situation), a physical load balancer, a server, a client, a physical internal service, a desktop, a router, a node, a network switch, a laptop or other computing device, such as device 500 FIG. 5. A virtual network object or a type of virtual network object is at least one of a virtual host, a virtual disk, a virtual load balancer, a database, a logical clustered group of resources, a macro-component, a logical service, a virtual internal service, a virtual computing device, that exists on or is a device 500 FIG. 5. Each of the network objects may include at least one communication interface for communicating with at least one other network object, such as interface 516 in FIG. 5.

In some cases, application 114 has parts or plug-ins executing on another network object; or is communicating data with another network object. For example, network object 110e is related to object 110c and has related executing application 116 that is related to the application 114 because the applications 114 and 116 are communicating data with each other as a result of the execution of application 116. For example, the application 114 may be a server application which is sending webpage data to the application 116 which is a client application displaying the webpage to a user, and the topology for the server is being determined. It can be appreciated that this relationship of the applications 114 and 116 could be reversed and the system 102 would be mapping out the topology for the client computer. Also, the object 110f is related to the object 110c because the application 114 is obtaining data through the object 110f from a disc or database of the object 110g. For example, the object 110f may be a router or Internet switch which is routing advertisements from ad server source object 110g to the application 114. Other relationships between network objects are also considered as noted herein and the network objects related to application 114 will be included in the topology information.

The network 100 includes the network object 120 and the separate network object 130 which together are the system 102. The system 102 may include additional components. In one case, the objects 120 and 130 may be the same network object. The network object 130 includes the server 130a and the user input/output (IO) device 170 having the display 172 and the user input 174. The server 130a may be a network object as noted herein. The device 170 may be a server, client, desktop, laptop or other computing device, such as noted for device 500 FIG. 5. The display 172 may be or include a computer display, touchscreen or other device capable of rendering or displaying computer graphics. The input 174 may be or include a computer input device, such as a keyboard, mouse, touchpad, touchscreen, voice activated input and/or the like.

The network 100 includes network connections between the network objects, as shown by the lines connecting pairs of the network objects. Specifically, the object 110c is connected to the objects 110a, 110b, 110c, 120, 140 and 110i. The object 110b is connected to the object 110d; the object 110i is connected to the object 110h; and the object 110f is connected to the object 110g. Each connection may represent a connection between the network interfaces of each of the objects being connected. Such connections may be or include network: connections communication channels, routers, nodes, network switches, hardware, software, wired connections, wireless connections and/or the like. In some cases, each connection may represent one of different types of relationships like a physical connection, a logical connection, a dependency relationship and/or any other type of relationship between the two objects. Each network connection may be capable of being used to communicate network data, packets, network messages, calls, signals, streams, arrays, flagged samples and feedback described herein.

The "selected" application 114 may be an application, a component, and/or a network object of a network that it is desired to discover the network topology or topology information of; and/or that it is desired to display a graph representation of that topology of. The network object 110c is a "selected" object such as by being the selected network object and/or a network object upon which the selected software application 114 is executing. For example, the network 100 may be an environment in which the system 102 can display graph representations over time of a topology of the network 100 that is involved in execution of or accessed during execution of the selected application 114 which is executing on the network object 110c thus making object 110c a "selected" network object.

The selected application 114 may be selected by a user having access to system 102. The user may be an analyst, administrator, or other person; or a software application having access to the system 102. The input 174 of the input/output (I/O) device 170 may be used by the user to select (e.g., predetermine or identify) the selected application 114. This selection may cause the system 102 to perform continual automated discovering over time of the topology of; and/or displaying of a graph representation of network objects for or communicating with the executing application 114. Discovering and/or displaying of a graph representation of the topology may occur for a selected period of time and optionally for additional subsequent periods of time as noted herein.

Figure 2:
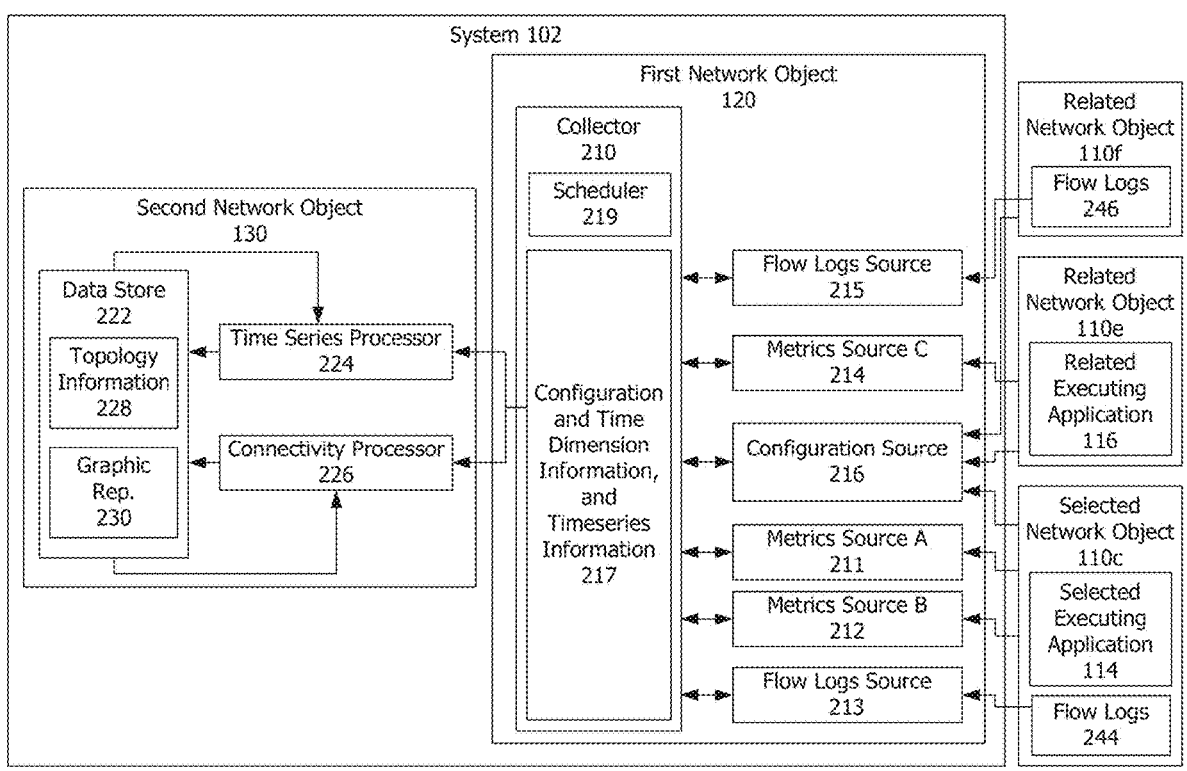
FIG. 2 is a portion of the network of FIG. 1 that includes the system for creating and displaying of a graph representation and the selected executing application.

Referring now to FIG. 2, there is shown a portion 200 of network 100 that includes the system 102 and the selected executing application 114 executing on the network object 110c of FIG. 1. The network object 120 is connected by network connections to and between the network object 130 and: the selected network object 110c, the related network object 110e and the related network object 110f as shown.

The network object 120 includes at least a collector 210, a scheduler 219, configuration and time dimension information (CTD), and timeseries (TS) information 217, and two or more of sources 211-216 for sending the information 217 to the collector 210. Herein, the information 217 may be referred to in separate parts as a configuration and time dimension information (CTD) part, and a timeseries (TS) information part of the information 217. It may also be referred to together as the CTD and TS information 217. The two or more sources includes a configuration source and at least either a flow logs source or a metrics source. Additional sources may also be used to collect the information 217.

In some cases, there is one configuration source that is connected to each network object the collector 210 is collecting the information 217 from. The configuration source may collect configuration information regarding how each network object is configured that is used to produce the information 217. There is also a number of metric sources connected to any number of the network objects the collector 210 is collecting the information 217 from. Each metrics source may collect metrics information regarding a type of metrics for a network object that is used to produce the information 217. More than one metric source can be connected to any single network object to collect more than one type of metrics from that object. There is also a number of flow logs sources, each connected to any of the network objects the collector 210 is collecting the information 217 from. Each flow logs source may collect flow logs information for or from a network object that is used to produce the information 217. Each flow logs source can be reading or copying the flow logs of a switch, node or flow logs providing service.

As shown in FIG. 2, the object 120 has a metrics source A 211, a metrics source B 212, a flow logs source 213, and a configuration source 216 for collecting the information 217 from the selected object 110c and/or the selected application 114. More specifically, the configuration source 216 is connected by network connections to and receives configuration information from the selected object 110c as part of the information 217. It may detect configuration information of or for the selected object 110c based on the execution of the application 114 and send that configuration information to the collector 210. For example, configuration source 216 may be collecting configuration information such as text identifying internet protocol (IP) addresses, logical media access control (MAC) address, physical MAC address, internal disc types, CPU types, random access memory (RAM) memory types, read only memory (ROM) data, switch/node configuration data, switch data routing data, and other configuration data of each network object.

Next, the metrics source A 211 and the metrics source B 212 are connected by network connections to and receive metrics information from the selected object 110c as part of the information 217. They may collect and send to the collector 210 two different types (e.g., type A and B) of metrics information as based on the execution of the application 114. For example, the metrics source A 211 may be collecting the metrics information of the memory, computer processing unit (CPU) and inputs/outputs (IOs) performed by one hard drive (e.g., by disk 1) of the object 110c; while the metrics source B 212 is collecting the metrics information of the inputs/outputs (IOs) performed by a second hard drive (e.g., by disk 2) of the object 110c.

Also, the flow logs source 213 is connected by network connections to and receives data from the flow logs 244 of or within the selected object 110c as part of the information 217. In some cases, as noted further below, each flow log of the logs 244 may include data in all or some of the following fields: version, account-id, interface-id, srcaddr, dstaddr, srcport, dstport, protocol, packets, bytes, start, end, action, log-status. The source 213 may read the flow logs 244 and send all or part of those logs as flow logs information to the collector 210. For example, the flow logs source 213 may be collecting or reading flow logs information including the source network object (e.g., source IP address), target network object (e.g., target IP address) and possibly type of communication of the communication messages of the flow logs for the network communication traffic at or flowing through the object 110c. As noted, the network object 110e is related to the object 110c due to data communication between applications 114 and 116. Thus, the flow logs information of information 217 collected from the object 110c may include flow logs 244 of the communication between the applications 114 and 116, and/or the objects 110c and 110e. Also, as noted, the network object 110f is related to the object 110c because the application 114 is obtaining data from the object 110g through the object 110f. Thus, the configuration information and/or metrics information of information 217 collected from the object 110c may include information related to the communication between the objects 110c and 110f.

Further, as shown in FIG. 2, the object 120 has a metrics source C 214, and the configuration source 216 for collecting the information 217 from the related object 110e. The metrics source C 214 is connected to and receive metrics information from the related network object 110e; and send that as the TS part of the information 217 to the collector 210 such as noted for the metrics sources A 211 and B 212 collecting the metrics information of the object 110c. The configuration source 216 is connected to and receives configuration information from the related object 110e; and sends that as the CTD part of the information 217 to the collector 210 such as noted for the configuration source 216 collecting the configuration information of the object 110c.

As noted, the network object 110e is related to the object 110c because the application 114 is a server application which is sending webpage data to the application 116 which is a client application displaying the webpage to a user. Thus, the configuration information and/or metrics information of information 217 collected from the object 110e may include information related to the communication between the objects 110c and 110e.

In addition, as shown in FIG. 2, the object 120 has a flow logs source 215 and the configuration source 216 for collecting the information 217 from the related object 110f. The flow logs source 215 is connected to and receives flow logs information from the flow logs 246 of the related network object 110f; and sends that as part of the CTD part of the information 217 to the collector 210 such as noted for the flow logs source 213 reading the flow logs 244 of the object 110c. The configuration source 216 is connected to and receives configuration information from the related object 110f; and sends that as part of the CTD part of the information 217 to the collector 210 such as noted for the configuration source 216 collecting the configuration information of the object 110c. As noted, the network object 110f is related to the object 110c because the application 114 is obtaining data from the object 110g through the object 110f. Thus, this flow logs information of information 217 collected from the object 110f may include flow logs 246 of the communication between the objects 110c and 110f.

The sources 211-216 are connected to receive source information (e.g., configuration information, flow log information and metrics information) from the network objects; and transmit the information to collector 210 as the information 217. The information 217 may be periodically transmitted by the sources to the collector, such as tens or hundreds of times during each selected period of time (e.g., see 360 of FIG. 3).

Each of the sources 211-216 may be a pluggable application program interfaces (API) source. In some cases, each of the sources 211-216 is a "pluggable" data source or collector that can be deployed in runtime or during operation of the system 102 to enable process 300 of FIG. 3 to be performed for various examples of the network 100, the selected application 114, the period of time, the subsequent period of time, and the time between an end of the period of time and a beginning of the subsequent period of time. Using pluggable sources also allows those sources to be deployed by the system 102 during subsequent periods of time to expand the system 102 or fix pluggable sources that do not function correctly. This can enable non-disruptive break/fix cycles for the system 102.

Figure 3:
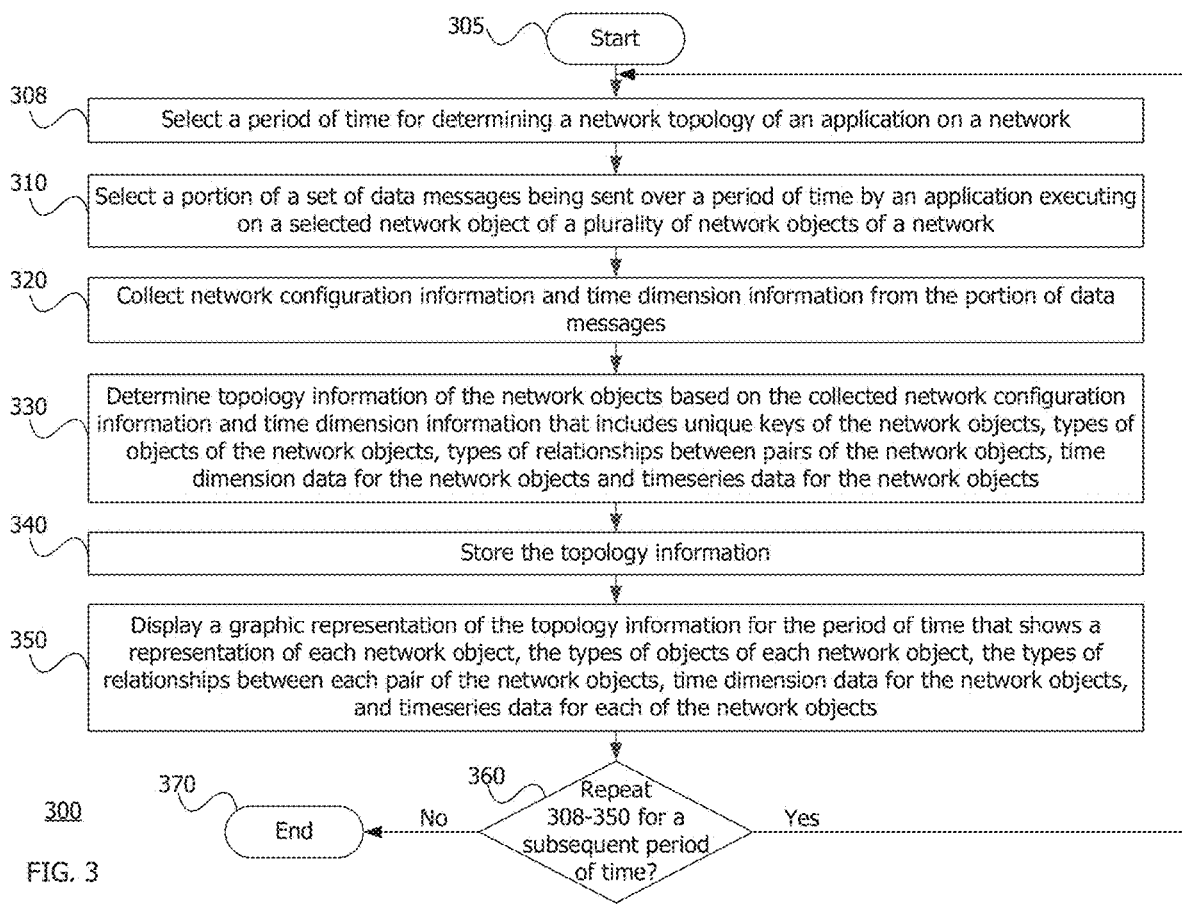
FIG. 3 is an operating environment/process for creating and displaying of a graph representation of the topology information of the selected executing application of the computer communication network.

The collector 210 also includes a scheduler 219 for scheduling time periods for and determining whether to automatically repeat the continual automated discovering of and/or displaying a graph representation of the topology information (e.g., see 360 of FIG. 3). In some cases, the scheduler 219 exists on the object 130 and/or as part of data store 222. The collector 210 also includes the CTD and TS information 217 determined based on the source information collected from sources 211-216; and for being sent by the collector to the network object 130. The information 217 may be periodically transmitted by the collector to the network object 130, such as tens or hundreds of times during each selected period of time (e.g., see 360 of FIG. 3).

The network object 130 includes at least a data store 222, a time series processor 224 and a connectivity processor 226. The time series processor 224 and connectivity processor 226 are connected by network connections to and receive information 217 from the collector 210 as shown.

In some cases, a network configuration and time dimension information (CTD) part of the information 217 from the sources 211-216 is the configuration information collected by source 216 and the flow logs information collected by the source 213 for the application 114 and the network objects related to the application 114. In these cases, the CTD part of the information 217 is sent to the connectivity processor 226, which processes that information to determine or create unique keys of, types of objects of, types of relationships between pairs of, groupings of and time dimension data of the network objects part of the topology information 228. The time dimension data may show and/or show changes over time in the topology configuration or topology information 228 over time, such as changes in the existence of, types of objects of, types of relationships between pairs of, and groupings of the network objects. It is considered that in certain cases, the TS part of the information 217 may also be processed by the processor 226 to determine or create unique keys of, types of objects of, types of relationships between pairs of, groupings of and time dimension data of the network objects part of the topology information 228.

In these cases, the timeseries information (TS) part of the information 217 from the sources 211-216 is the metrics information (e.g., timeseries data) collected by metrics sources 211 and 212 for the application 114 and the network objects related to the application 114. In these cases, this TS part of the information 217 is sent to the time series processor 224, which processes that information to determine or create timeseries data part of the topology information 228. The timeseries data may show and/or show changes over time in the performance metrics of the network objects of the topology configuration or topology information 228. It is considered that in certain cases, the CTD part of the information 217 may also be processed by the processor 224 to determine or create the timeseries data part of the topology information 228.

The time series processor 224 and the connectivity processor 226 are also connected to and transmit the topology information 228 to the data store 222 based on or determined from the information 217 received from the collector 210 and data received from the data store 222 as shown. This topology information 228 may be periodically transmitted from processors 224 and 226 to the data store 222 as noted for periodic transmission of information 217.

The data store 222 includes the stored topology information 228 that is received from the time series processor 224 and the connectivity processor 226. The data store 222 also includes graph representations 230 for displaying (e.g., creating and/or displaying) various graph representations of topology information 228.

The data store 222 is connected to and transmits the topology information 228 back to the time series processor 224 and the connectivity processor 226. For example, the processing of the information 217 performed by processors 224 and 226 to determine topology information 228 may depend on (1) the new data coming in as information 217, and (2) the state of the topology information 228 is it currently exists and as it was in the past. The information about the past state of topology information 228 is already stored in the data store 222, such as past versions of topology information 228. The state of the topology information 228 is it currently exists and as it was in the past flows along the two arrows from 222 to 224 and 226. This topology information 228 may be periodically transmitted from the data store 222 to processors 224 and 226 as noted for information 217.

The network object 120 may represent a first "agent" such as hardware of and/or software executing on a first network object. The network object 130 may represent a second "agent" such as hardware of and/or software executing on a second network object. In one example, the objects 120 and 130 are generic physical network object architectures that achieve detecting and/or displaying of a graph representation the topology information in a way that is independent of a specific cloud provider, such as the Amazon Cloud™, Microsoft Cloud™ or Google Cloud™. In this case, the object 110c may be cloud based, such as including a cloud based router, switch or flow logs providing service (e.g., cloud provider service by Google Cloud™), and the flow logs are virtual private cloud (VPC) flow logs for network communication being performed by the object 110c.

In some cases, the objects 120 and 130 are not limited to being implemented in a cloud. They can function very well with an on-premise or local area network (LAN) installation. In this situation instead of using flow logs source 213 and 215 to read Flow Logs, those sources could read equivalent "flow logs" of a local switch, router, service and the like which are very similar to VPC flow logs and can be produced by some hardware switches.

Using the system 102 and the connections shown it is possible to perform displaying of a graph representation over (e.g., during) a selected period of time (and optionally subsequent periods of time) of the topology of network objects for the selected executing application 114. Displaying the graph representation of the topology is one type of use of the discovered topology information 228. In addition to that functionality of visualization, the topology information 228 has other important uses. Specifically, the topology information 228 includes a representation of knowledge on how the application 114 works internally with respect to its interaction and communication with other (e.g., "related") network objects. The topology information 228 can be a model usable to analyze situations where the application 114 is not working correctly and to help identify why it is not working correctly using additional information such as measured metrics of different related network objects of the network 100.

Description of Processes

Referring now to FIG. 3, there is shown an operating environment/process 300 for displaying of a graph representation 230 over a selected period of time of the topology information 228 of network objects for the selected executing application 114 of the computer communication network 100. The process 300 may be or describe an operating environment in which the system 102 can perform the displaying of a graph representation 230. The process 300 may be performed by the system 102. The process 300 starts at 305 and can end at 370, but the process can also be cyclical as shown by the "yes" loop from 360 to 310, which provides displaying of a graph representation of topology information in a "continual automated" manner. The process 300 may begin at 305 after selecting object 110c and/or application 114. It can be appreciated that the process 300 can be repeated to determine the topology information 228 and/or graphic representations 230 for selected objects or applications, other than selected object 110c and/or application 114. For example, during the period of time or another period of time, another one of collector 210 can be used by object 120 to perform the process 300 to determine the topology information 228 and/or graphic representations 230 for a selected object or application in network 100, other than selected object 110c and/or application 114.

After 305 where process 300 starts, the process continues to 308 where a period of time is selected for displaying a graph representation of a network topology of an application executing on a network. This is selecting the "selected" period of time noted above and increases computer efficiency because there is a gap in time between such selected periods of time and subsequent periods of time (e.g., see at 360) during which the graph representation does not need to be displayed. Selecting the period of time at 308 may be performed automatically by the scheduler 219; or manually by a user at input 174. Selecting at 308 may be part of selecting the period of time, the subsequent period of time, and a time between an end of the period of time and a beginning of the subsequent period of time at noted at 360. The selected period of time may be used by the object 130 and/or data store 222 to display a graph representation 230 of the topology information 228 only for the period of time and/or subsequent periods of time; and may be used by the collector 120 to program or control the sources 211-216 to collect information 217 only during the period of time and/or subsequent periods of time.

After 308, at 310 a portion is selected of a set of data messages being sent during or over the selected period of time of 308 by a selected application 114 executing on a selected network object of a plurality of network objects of the network 100. Selecting at 310 may be selecting a portion of a set of data messages being sent and being received during the selected period of time of 308 by a selected application 114. The selected portion of the set of data messages may be used by the object 130 and/or data store 222 to display a graph representation 230 of the topology information 228 only for the selected portion of the set; and may be used by the collector 120 to program or control the sources 211-216 to collect information 217 only for the selected portion of the set. Selecting a portion at 310 increases computer efficiency because it avoids displaying the graph representation for all of the set of messages. In some cases, in addition to selecting a portion of the set of messages for the application 114, selecting at 310 also includes selecting another portion of another set of data messages being sent and/or received during the selected period of time by a related application and/or network object. For example, 310 could include also selecting portions of the sets of data messages sent and received by the related application 116 and/or the related network object 110f, similar to the selecting a portion of the set of messages sent by the application 114.

After 310, at 320 the network CTD and TS information 217 is collected from the portion of data messages from 310. The network object 120 may perform this collecting. Specifically, this collecting may be performed by the sources 211-216 reading or receiving the source information from the executing application 114 and/or the selected object 110c. Reading by the sources 211-216 may be controlled by the collector 210. For example, the controller 210 may cause sources 211-216 to only read information 217 for the portion of messages selected at 310; and to only read information 217 during the period of time selected at 308, and optionally during one or more subsequent periods of time (e.g., see at 360).

For example, based on the data read from the flow logs 244, the executing application 114 and/or the selected object 110c, the configuration source 216 may detect the configuration information part of some of the CTD part of the information 217 of the network object 110c. Next, based on the data read from the flow logs 244, the executing application 114 and/or the selected object 110c, the flow logs source 213 may detect the flow logs information of some of the CTD part of the information 217 of the network object 110c. Also, based on the data read from the flow logs 244, the executing application 114 and/or the selected object 110c, the metrics sources 211 and 212 may detect the metrics information of the TS part of the information 217 of the network object 110c.

In some cases, the information 217 collected at 320 may include or may be based on the flow logs 244. Here, collecting at 320 may include the sources 211-216 reading the data from the communication flow logs 244, where each flow log is associated with a data message received or transmitted by the selected executing application 114.

The collector 210 may send the connectivity processor 226 the network CTD part of information 217 which includes or can be used to identifying unique keys of the network objects, IP addresses of the network objects, types of objects of the network objects, types of relationships between pairs of the network objects and time dimension data for the network objects for the executing application 114 during the selected period of time. The collector 210 may also send the time series processor 224 the TS part of information 217 which includes or can be used to identify timeseries data for the network objects for the executing application 114 during the selected period of time.

In some cases, in addition to collecting a portion of the set of messages sent by the application 114, collecting at 320 also includes collecting CTD and TS parts of information 217 from other portions of data messages sent by a related application and/or network object.

For example, collecting at 320 could include collecting CTD and TS parts of information 217 from portions (e.g., see selecting at 310) of the sets of data messages sent by the related application 116 and/or the related network object 110e, similar to the collecting a portion of the set of messages sent by the application 114 and/or the object 110c. Here, configuration source 216 collects the configuration information of the application 216 and/or the object 110e; and the metrics source C 214 collects the metrics information of the application 216 and/or the object 110e.

Also, collecting at 320 could include collecting CTD and TS information 217 from portions (e.g., see selecting at 310) of the sets of data messages sent by a related application by (or through) and/or by the related network object 110f, similar to the collecting a portion of the set of messages sent by the application 114 and/or the object 110c. Here, configuration source 216 collects the configuration information of the flow logs 246 and/or the object 110f; and the flow logs source 215 may also collect the flow logs information of the flow logs 246 and/or the object 110f.

After 320, at 330 the topology information 228 of the network objects related to application 114 is determined over the period of time based on the collected CTD and TS information 217. Determining at 330 may be performed by the connectivity processor 226 processing the network CTD part of the information 217 sent by the collector 210 to create the connectivity part of the information 228; and/or by the time series processor 224 processing the TS part of the information 217 sent by the collector 210 to create the timeseries part of the information 228.

For example, the connectivity processor 226 determines from the received CTD part of information 217, the connectivity part of the information 228 which may include the unique keys of the network objects, the types of objects of the network objects, and the types of relationships between pairs of the network objects, the groupings of the network objects and time dimension data for the network objects related to the executing application 114. The time dimension data may show changes over time in the connectivity part of the information 228, such as changes in the existence of, types of objects of, types of relationships between pairs of, and groupings of the network objects related to the application 114 during the period of time. It is considered that in certain cases, the TS part of the information 217 may also be processed by the processor 226 to determine or create the connectivity part of the topology information 228.

Also, the time series processor 224 determines from the received TS part of the information 217, the timeseries (e.g., metrics) part of the information 228 for the network objects related to the executing application 114. The timeseries data may show the and/or show changes over time in the timeseries part of the information 228, such as changes in the performance metrics of the network objects related to the application 114 during the period of time. It is considered that in certain cases, the CTD part of the information 217 may also be processed by the processor 224 to determine or create the timeseries part of the topology information 228.

The determined topology information 228 at 330 can be stored in the data store 222 as noted at 340 and/or displayed in a graph representation as noted at 350.

In some cases, determining the topology information 228 at 330 also includes the connectivity processor 226 sending the processed connectivity part of information 228 (e.g., what the processor 226 determines from the received CTD part of the information 217) to the data store 222; and receiving from that store 222 current and/or prior determined connectivity information (e.g., a stored model of a prior connectivity part of the topology for the application 114 at a prior point in time). The connectivity processor 226 then determines the connectivity part of the information 228 using the configuration part of the information 217 received from the collector 120 and the prior connectivity information part of topology information 228 received from the store 222. Similarly, determining the topology information 228 at 330 may also include the time series processor 224 sending the processed timeseries part of information 228 (e.g., what the processor 224 determines from the received TS part of the information 217) to the data store 222 and receiving from that store 222 current and/or prior determined timeseries information (e.g., stored timeseries data for a prior topology for the application 114 at a prior point in time). The time series processor 224 then determines the timeseries part of the information 228 using the time series part of the information 217 received from the collector 120 and the prior timeseries information part of topology information 228 received from the store 222.

Figure 4A:
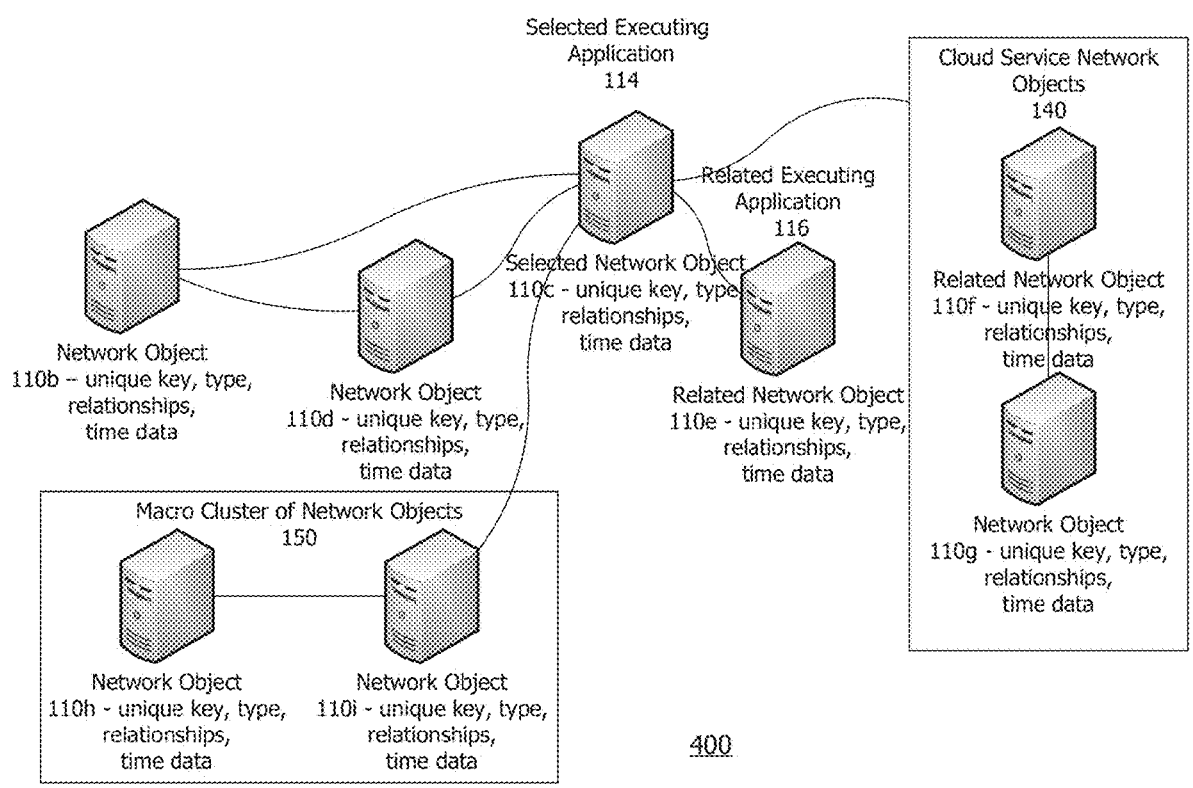
FIG. 4A shows a graph representation of topology information of the computer network for the selected application for a period of time.
Figure 4B:
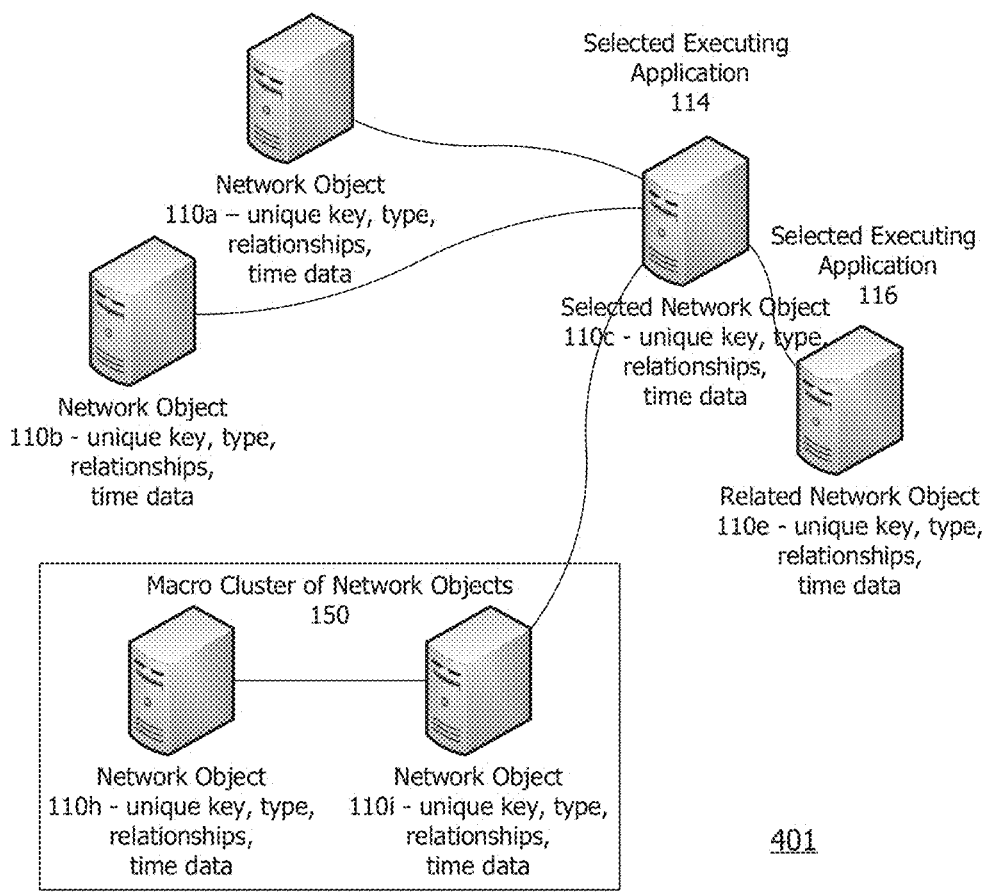
FIG. 4B shows a graph representation of topology information of the computer network for the selected application for a subsequent period of time.
Figure 4C:
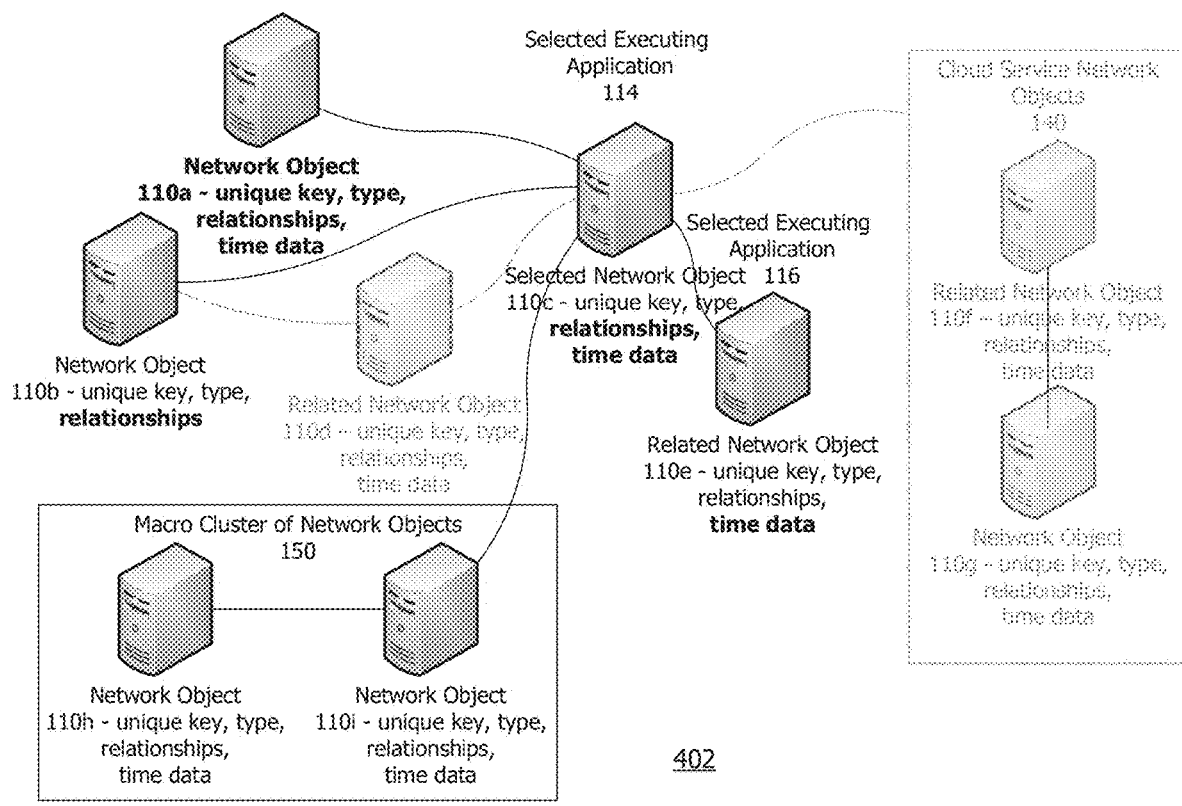
FIG. 4C shows a graph representation showing changes between graph representations of FIGS. 4A-B.

Determining the topology information 228 at 330 may include determining the physical network objects, virtual network objects, software applications and/or hardware for each network object that the selected application 114 is related to, communicating with, as well as for the selected application 114. In some cases, at least network objects 110*e* and 110*f* are related to object 110*c* as noted above. For example, the topology information 228 may be for the selected application 114 and/or network object 110*c* and show the network objects communicating with or having a relationship with the selected application 114 and/or network object 110*c* due to execution of the application 114, such as shown in FIGS. 4A-C.

The determined topology information 228 may be unique keys of the network objects, types of objects of the network objects, types of relationships between pairs of the network objects, groupings of the network objects, time dimension data for the network objects, and optionally timeseries data (e.g., metrics data or the timeseries part of the information 228) of any network objects that are discovered or determined to be part of the topology information 228 of the network 100 for the executing application 114 during the period of time.

The unique key of a network object may be one (a single) key that uniquely identifies each network object from the others. Each key may be determined or selected by the connectivity processor 226 from or based on the configuration part of the information 217 received from the collector 210 and of the topology information 228 received from the store 222 by the connectivity processor 226.

In some cases, every network object of the topology information 228 has at least one unique key and may possibly have multiple "keys" that are completely unique. A unique key cannot be repeated or reused within a single network object and cannot be used in or for more than one network object of the topology information 228 (e.g., because that would lead to these two objects to be merged into a single object).

As information 217 is collected for the network objects, each object is given unique key by processor 226 on a case by case basis. The unique keys are derived by the processor 226 per specific network object from what of the topology information 228 can represent this object in a unique way, within the specific technology domain of the network 100. Every new object and/or object's technology that is added to the topology requires the processor to make a decision about what key (or set of keys) should be used for this situation and/or object. In some cases, if it is available, the key is a fully qualified name (FQN) of a server. In cloud systems (e.g., cloud objects 140), usually the cloud provider has or provides specific keys that represents each object which can be used as a unique key. For example, AWS (Amazon Cloud™) has a set of internal unique keys (e.g., ARN—Amazon-Resource-Name) per each network object of a network that the processor 226 can use as the unique keys. Similar sets of keys from other cloud providers such as Microsoft Cloud™ or Google Cloud™ can be used. In a different domain, such on-premise the processor 226 can use logical media access control (MAC) addresses and/or physical MAC addresses from networking or other identification keys from technologies such as VMWare™ or other virtualization and cloud computing software. In some cases, a fully qualified uniform resource locator (URL) may be used. It can be appreciated that a mixture of the above noted keys, or other data of information 217 can be selected or used to create the unique key for each of the network objects of topology information 228.

It is worth noting that while IP address is an attribute of some of the network objects, it may not be good to use as a unique key for various reasons. First, because it is very easy to setup networks where the same IP address is used in different parts of the network. Furthermore, some objects do not strictly have an IP address but use another addressing system (e.g. a disk, or elements that are connected via other communication method that is not based on TCP/IP). Also, a network object may have multiple IP addresses (e.g., in the case of a server) or no IP addresses at all (e.g., if the network object is an internal element such as a disk drive). Thus, while IP address can be used as a key, in many cases it cannot be used as a unique key because IP addresses can be replicated based on target network configuration, can be easily spoofed and do not represent all types of objects. However, IP addresses can be stored and referenced by the processors 224 and 226 as helpful reference meta information, of "nice to know".

A type of object of a network object may be a type of physical network object and/or a type of virtual network object as noted herein.

A type of relationship may broadly be a network relationship, a data relationship, a functional relationship between pairs of the network objects. In some cases, a type of relationship between pairs of the network objects may be a network object controlling actions performed by another network object, a network object communication with another network object, a network object depending on another network object in order to operate correctly, and/or a network object streaming data to another network object. However, these examples of relationships are not limiting. Any type of relationship can be expressed including relationships that are newly discovered by the processor 226 and were not previously programmed into that processor.

Time dimension data for a network object may be data that describes changes of that object over time. In some cases, the time dimension data may describe the occurrence and timing of the addition, existence and departure of network objects from the topology information 228 over the period of time. This description can be determined using or based on the CTD part and/or TS part of the information 217.

For example, the CTD part may be used by the processor 266 to determine time dimension data including the existence and properties of the network objects over the time period. This may include the processor 226 and/or data store 222 keeping topology information 228 over the period of time that includes time related notes of the events of when a network object was created or stopped existing as well as when certain properties of that object changed. This part of the information 217 can be queried by a user, within a required time range or the period of time. This may also include the processor 226 and/or data store 222 keeping topology information 228 that includes time related notes of when relationships between pairs of network objects began, changed and ended. These relationship notes can all be kept with a timestamp with relation to the network objects so this part of the topology information 228 can be later queried by a user, within a time range.

In some case, the timeseries part of topology information 228 for a network object may be data that describes changes in metrics for that object over time of network objects in the topology information 228. For example, the TS part of the information 217 may be used by the processor 224 to determine timeseries part of the information 228 including the different metrics signals of the network objects over the time period. This may include the time series processor 224 and/or data store 222 keeping topology information 228 that includes time related notes of the timeseries data of measured signals (e.g., collected at 320) that relate to each network object. The timeseries notes of the timeseries part of the information 228 are obviously related to a time and this part of the information 228 can be queried by a user, based on a time interval.

As part of determining the topology information 228 at 330, the network object 130 or the processor 226 may maintain a list of IP addresses and/or unique keys of the network objects received in the information 217; and determine if an IP address and/or unique key of a network object changes over time based on comparing the IP address and/or unique key of that object in the list with subsequently IP addresses and/or unique keys for that object received in the information 217. Determining the topology information 228 at 330 can include comparing this list over time to determine IP address and/or unique key changes of the network objects, types of relationship changes between pairs of the network objects, time dimension data and timeseries data for the network objects during the period of time.

In some cases, part of determining the topology information 228 at 330 includes determining the types of network objects and/or the types of relationships between pairs of the network objects based on grouping of multiple network objects and/or metrics determined for the network objects. In some cases, part of determining the topology information 228 at 330 includes automatically grouping network objects having a common function into cluster subsets and service subsets by creating a number of abstraction layers by interpreting low level relations between pairs of the network objects and collapsing functional groups of the network objects into higher level macro-components (e.g., macro cluster 150).

For example, this automatically grouping may include automatically detecting and segmenting macro-components: functional groups such as a micro-service (from that micro-service's low level communication and configuration dependencies) and allowing a grouping of set of resources with a common function (such as a cluster, a scaling group, a micro-service, and the like), and allowing a collapsed and/or expanded view (from an API perspective of the sources 211-216) of these functional groups.

As noted, the collected TS information 217 at 320 can include metrics data information for each network object, which may be used to determine the timeseries part of the information 228. In some cases, part of determining the topology information 228 at 330 includes time series processor 224 processing the TS part to automatically determine metrics for each network object of the information 228. Thus, determining topology information 228 at 330 can include determining if critical metric data is missing for any of the network objects based on the metric data information.

For example, based on the groupings, macro-components, collapsed views and/or expanded views, the object 130 can determine what the critical metrics are for each macro-component and what are the rolled-up individual key performance indicators (KPI) to the macro-component level. Determining the critical metrics and KPI provides a critical capability to a user accessing or displaying a graph representation 230 of the topology information 228 by performing calculations at 330 that are ad-hoc and constantly changing based on the underlying changing resources and configurations of the determined metrics, groupings, macro-components, collapsed views and/or expanded views. For example, a network object that is a service may have the following rolled-up metrics: "Average CPU utilization", "Max CPU utilization", "95th percentile CPU utilization", representing the roll-up of CPU metrics at a time where the number of hosts is constantly changing over time. In one case, the selected network object 110c may have these rolled-up metrics that can be identified in the graph representation 230 while the network objects in the topology information 228 changes in number during the period of time. In some cases, this rolled up information will remain in the data store 222 as prior topology information 228, even after the network objects that were a part of the rolled up result no longer exist in the current topology information 228 (e.g., as they are of an ephemeral nature in clouds or containers). So, the rolled up data can be used as evidence in a troubleshooting process for the selected application 114 even if some of the network objects at the time of a troubling issue are already gone from the current topology information 228. The determining of metrics data of network objects at 330 increases computer efficiency because the metrics data can also be used by the object 130 to determine the types of network objects and/or the types of relationships between pairs of the network objects during the period of time.

After 330, at 340 the topology information 228 of the network objects over the period of time is stored. For example, at 340 the network object 130 may store the topology information 228 received from the processors 224 and 226 in data store 222. The data store 222 can be the storage 514 and/or the memory 512 of FIG. 5. This storing may include the data store 222 storing the processed portion of the collected network CTD information sent by the collector 210; and/or the processed portion of the collected TS information sent by the collector 210. The stored topology information 228 may be sent to the processors 224 and/or 226 as shown by the arrows in FIG. 2 for determining the topology information 228 during the current period of time or a subsequent period of time (e.g., see at 360 of FIG. 3). The stored topology information 228 may be used for displaying a graph representation 230 of the topology information (e.g., also see FIGS. 4A-C).

After 340, at 350 a graph representation 230 of the topology information 228 of the network objects over the period of time may optionally be created and/or displayed. The user input/output (I/O) device 170 may be used to select creating and/or displaying one or more of graph representation 230 at 350. This selection may cause the data store 222 and/or the I/O device to access the topology information 228 stored in data store 222 and create a graph representation 230 of some or all of that topology information 228 for one or more points in time during the time period. The selection may also cause the data store 222 and/or the I/O device to display the created graph representation 230 on the display 172.

In some cases, the graph representation 230 at 350 is created using a rich query language having a data model that contains both graph information, measurements and time information for the topology information 228. For example, the data model may include the unique keys, types, relationships, groupings and time data of the network objects in the topology information 228. The "time data" is the time dimension data and optionally, also optionally the timeseries data of the network objects in the topology information 228. The rich query language may be software operating on the object 130 and/or the data store 222; and the data model may be or include the topology information 228 and the graph representation 230. Also, displaying the graph representation 230 at 350 may include the I/O device 170 posing questions (e.g., graph queries to request a user desired graph representation 230) to a user related to a graph theory and related to a time data for the topology information 228. In some cases, the questions related to a graph theory for creating the graph representation 230 are questions related to graph theory along with a time dimension for all the data, and conditions on attributes, timeseries and summarizations. These questions may be part of the user selections for creating and/or displaying the graph representation 230 at 350; and/or the graph representations 400, 401 and 402 of FIGS. 4A-C. Using such a using a rich query language, data models and questions related to a graph theory increases computer efficiency because it provides an efficient way of combining graph data with time dimension data and timeseries data of the network objects for highly efficient access time for specific queries that are applicable for network management.

In some cases, at 350, the object 130 allows graph querying at the input 174 of the topology information 228 for creation of a graph representation 230 that includes metrics and/or timeseries data using or according to a graph structure that shows a map of the structure of the topology of, timeseries data for, and metric data for the network objects of the topology information for the application 114. In some cases, displaying the graphic representation 230 at 350 includes displaying that missing critical metric data is missing for any of the network objects at noted for determining the topology information 228 at 330. For example, one graph query may be "find all nodes that are 1 degree away from a service node, using a certain type of relationship and node time AND that they have a Timeseries S1 with sample count of more than X between T1 and T2". Use of such a graph query increases computer efficiency because it is a graph related query to create a graph representation 230 from the topology information 228 that is appropriate to the networking domain of the network 100 may include time dimension and other measurements. In some cases, the increase in efficiency is massive due to very large scale conditions (e.g., hundreds or thousands of network objects) of the network 100. For example, the bigger the scale the more expensive it is to determine a solution to a problem of application 114 when the topology data and timeseries data are located in different databases, as compared to using the system 102. Use of such a graph query increases computer efficiency because it enables implementation of "detachable algorithms" that can detect a certain pattern of the topology information 228 at the system 102, but that can perform the detection at the system 102 from anywhere in a network.

For example, at 350 a graph representation 230 of the topology information 228 for the period of time may be displayed on the display 172. Creating and/or displaying the graph representation 230 may include creating and/or displaying the unique keys, types, relationships, time data (e.g., time dimension data and optionally timeseries data) of the network objects in the topology information 228. Creating and/or displaying the graph representation 230 increases computer efficiency because it shows a representation of each network object, the unique key of each network object, the types of object of each network object, the groupings of the network objects, the types of relationships between each pair of the network objects, and time data for the network objects in the topology information 228. Here, the "time data" is the time dimension data (e.g., of the connectivity part of the information 228) and optionally, also the timeseries data (e.g., timeseries part of the information 228) of the network objects in the topology information 228. The graph representation 230 may be a two-dimensional or three-dimensional view of the requested part of the topology information 228 that includes a map or graph, or topology interconnection display having: a representation of, unique keys of, type of object of, types of relationships between pairs of, groupings of and time data of each network object that satisfies the graph representation of topology information 228 requested by the user.

The representation of each object may be an image, symbol, text and/or another indicator that distinctly identifies each network object. For example, FIG. 4 shows the objects as a desktop or server computer symbol, but those symbols are only representations as a network object may actually be any of various types of network objects. The type of object and the types of relationships between each pair of the network objects may be as noted herein. The time data for each network object may be used to show changes in the graph representation 230 and in performance of the objects in that representation over time.

Also, displaying at 350 may include inputting a combined query for more than one of the unique keys of, type of object of, types of relationships between pairs of, metrics of, and/or time data of each of the network objects as requested by the user for a graph representation 230 that changes over time due to the changes or dynamics over time of the topology information 228. This inputting increases computer efficiency because it can create a graph representation 230 for a combined query on a graph of network objects that is changing over time, or a graph that is related to other metrics (or even timeseries data) and have an efficient way of querying using the topology information 228 and metrics constraints together.

Allowing requests that show a graph representation 230 including dependencies in and between the network objects of the topology, such as services or components, increases computer efficiency because it allows users or application developers to more easily and naturally understand which metrics to use to evaluate an application 114 or topology of that application. Such representation can answer "who is using this component, and what other components are using this one?" The answer to this question can be of great importance and can help choose a relevant timeseries or period of time for comparing the topology information 228.

For example, creating and/or displaying at 350 may also show changes in the graph representation 230 of the representation of each object over the period of time. These changes may be according to or based on the changes in and/or time data (e.g., time dimension data and optionally timeseries data) of the topology information 228. Creating and/or displaying the changes in graph representation 230 increases computer efficiency because it allows the user to more easily identify and track changes over time to the topology information 228.

In some cases, the graph representation 230 may be a periodic sequential series over time of the graph representations of the topology information during part or all of the period of time. In some cases, the graph representation 230 may be one or more non-periodic series of the graph representations of the topology information at one or more points in time during the period of time. The user input 174 may be used to select displaying the periodic sequential series and/or non-periodic series of the graph representations of the topology information at one or more points in time during the period of time.

For example, the display 172 or the input 174 may display a time bar having a range from the beginning to the end of the period of time and a slidable location indicator on the time bar that can be located along the period of time by the input 174 (e.g., manipulated by sliding or clicking using a keyboard or mouse) to select displaying the graph representation 230 at/for points in time of the period of time selected using the indicator. The indicator may be slid forward or backward along the period of time to display the changes between a first point in time and a second point in time on the bar. The changes in the graph representation 230 may be shown with marks such as highlighting, shadowing, fading, lightening, darkening, bold, underline, italics and/or the like.

After 350, at decision block 360 it is decided whether process 300 (e.g., 310-360; or optionally only 330-360; or optionally only 350-360) will be repeated. If so, process 300 returns to 310 where process 300 repeats for a subsequent period of time, such as where after returning to 310, the period of time referred to in 310-350 is for a subsequent period of time. Here, the original or initial period of time may be referred to as a "first period of time." If process 300 will not be repeated at 360, process 300 ends at 370.

In some cases, process 300 is repeated for between ten and thousands of subsequent periods of time. There may be a delay at 360 between the first period of time during which messages were sampled at 310, and the subsequent period of time during which messages will be sampled at 310 after 360.

Deciding at 360 or causing repeating at 360 may be automatically performed by a scheduler 219 of the collector 210 or performed by a user at the input 174. Selecting the period of time, the subsequent period of time, and a time between an end of the period of time and a beginning of the subsequent period of time may also be automatically performed by the scheduler 219 or performed by a user at input 174.

In one case, the period of time is between 5 and 10 minutes, the subsequent period of time is between 5 and 10 minutes, and the subsequent period of time occurs after each end of a prior period of time, one of periodically having a period that is between 50 to 70 minutes, or randomly between 50 and 70 minutes after each end of a prior period of time. In another case, the period of time is between 2 and 5 minutes, the subsequent period of time is between 2 and 5 minutes, and the subsequent period of time occurs after each end of a prior period of time, one of periodically having a period that is between 10 to 20 minutes, or randomly between 10 and 20 minutes after each end of a prior period of time.

Repeating at 360 may be repeating creating and displaying a graph representation topology information at 350 for the at least one subsequent period of time. Repeating creating and displaying at 360 may cause or include repeating determining at 330 and storing at 340, for the at least one subsequent period of time.

After 360, and repeating 310-340, displaying the graph representation 230 at 350 may include displaying changes between topology information for the period of time and topology information for the subsequent period of time as noted at 360. Displaying the changes may optionally include graphically identifying where changes in the graph representation 230 and/or the topology information 228 have occurred between the period of time and the subsequent period of time with marks as noted at 350.

The user input 174 may be used to select displaying the graph representation 230 of the topology information at a point in time during the period of time, and a further graph representation of the change between topology information for that point and time, and a) another point in time during the period of time, or b) a subsequent point in time during the subsequent period of time. In some cases, the input 174 may be used to select sequentially displaying the graph representation for a point in time and a further point and time during the period of time, and/or a subsequent point in time during the subsequent period of time.

For example, FIG. 4A shows a graph representation 400 of topology information of network objects of the computer communication network 100 for the selected application executing 114 on the selected network object 110c for a (e.g., a first) period of time. The graph representation 400 may be the graph representation 230 of the topology information 228 at a point in time during the (e.g., first) period of time at 360 of FIG. 3.

The graph representation 400 for the software application 114 shows the network object 110b, the network object 110c (the object where application 114 is executing and communicating from), the network object 110d, network object 110e, the cloud objects 140 and the cluster of objects 150. The network object 110b is connected to the network object 110d. In other words, the application 114 and/or the network object 110c is communicating with each of the network object 110*b*, the network object 110*d*, network object 110*e*, the cloud (or grouping) objects 140 (which include the network objects 110*f* and 110*g*) and the network object 110*i* of the cluster of objects 150 which is connected to the network object 110*h* of the cluster (or grouping) of objects 150. It is noted that the network objects 110*a* of the network 100 is not included in the graph representation 400, because it is not part of the topology information 228 at the point in time (e.g., during the period of time) selected for the display of the graph representation 400.

For each of these network objects, the graph representation 400 shows a graph representation of that network object; the unique key of that network object; the type of object of that network object; the types of relationships between that object and each network object connected to that object, the groupings for that network object, and time data for that network object. The time data may be a change of the graph representation over time and/or a change of a showing of the metrics data for each of the objects over time. For example, some objects may be removed from and/or added to the representation; and/or small windows may be displayed next to each of the objects showing one or more metrics data for each object may be displayed.

Specifically, the graph representation 400 shows an image of a desktop or server computer for each network object a rectangle and a label for the groupings for each group of the network objects; and lists text representing each network object's unique key, type; relationships and time data for each of: the network object 110*b*, the network object 110*c*, the network object 110*d*, network object 110*e*, the cloud objects 140 and the cluster of objects 150. The image of a desktop or server computer is only used representatively as the type of network object of each network object may vary widely as noted herein.

As noted at 350 of FIG. 3 the graph representation 230 and/or the topology information 228 may change over time. For instance, the input 174 may be used to select one or more of the graph representations 230 to be displayed for various points in time during period of time and/or during a subsequent period of time.

For example, FIG. 4B shows a graph representation 401 of topology information of network objects of the computer communication network 100 for the selected application executing 114 on the selected network object 110*c* for a subsequent period of time, such as after the period of time of the representation 400. The subsequent period of time may be (e.g., a second) period of time after the (e.g., first) period of time as noted at 360 of FIG. 3. The graph representation 401 may be the graph representations 230 at a point in time during the subsequent period of time at 360 of FIG. 3.

The graph representation 401 for the software application 114 shows the network object 110*a*, the network object 110*b*, the network object 110*c* (the object where application 114 is executing and communicating from) and the cluster of objects 150. In other words, the application 114 and/or the network object 110*c* is communicating with each of the network object 110*a*, the network object 110*b*, the network object 110*e*, and the network object 110*i* of the cluster of objects 150 which is connected to the network object 110*h* of the cluster of objects 150. It is noted that the network objects 110*d* and the cloud of objects 140 of network 100 are not included in the graph representation 401, because they are not part of the topology information 228 at the point (e.g., during the subsequent period of time) in time selected for the display of the graph representation 401. In other words, the existence of the object 110*a* is included/added in; and the existence of the objects 110*f* and 110*g* is removed/stopped in the representation 401 as compared to the representation 400.

For each of these network objects, the graph representation 401 shows a graph representation of that network object; the unique key of that network object; the type of object of that network object; the types of relationships between that object and each network object connected to that object, the groupings for that network object, and time data for that network object. Specifically, the graph representation 401 shows an image of a desktop or server computer (e.g., being used as a representation of the network object) for each network object a rectangle and a label for the groupings for each group of the network objects; and lists text representing each network object's unique key, type; relationships and time data for each of the network object 110*a*, the network object 110*b*, the network object 110*c*, the network object 110*e* and the cluster of objects 150.

As noted at 350 and 360 of FIG. 3 the graph representation 230 may show changes over time in the representation and/or the topology information 228. For instance, the input 174 may be used to select displaying more than one of the graph representation 230 and/or changes in the graph representation 230 for various points in time during period of time and/or during a subsequent period of time. The changes in the graph representation 230 may be shown with marks, as noted at 350.

For example, FIG. 4C shows a graph representation 402 showing changes between the graph representations 400 and 401 of the topology information 228 of the network objects of the computer communication network 100 for FIG. 4A-B. The graph representation 402 may be changes in the graph representations 230 from a point in time during a first period of time and a point in time during the subsequent period of time at 360 of FIG. 3. In other cases, the graph representation 402 may be changes in the graph representation 230 for any first and second of various points in time during period of time and/or during a subsequent period of time.

The network objects of the graph representation 402 that were in the representation 400 but are not in the representation 401 (or the topology information 228 for those representations) are shown with faded symbols and text. The network objects of the graph representation 402 that were not in the representation 400 but are in the representation 401, or that were changed in the representation 401 as compared to the representation 400 (or the topology information 228 for those representations) are shown with bold or thicker text.

Specifically, the graph representation 402 shows the network object 110*a* in bold since it did not exist in the representation 400 but does exist in the representation 401 (e.g., and/or the topology information 228 for those representations). The graph representation 402 also shows the relationships of the network object 110*c* in bold since those have changed with respect to its relationships with the network objects 110*a*, 110*d* and cloud 140 (the network objects 110*f* and 110*g*). The graph representation 402 also shows the relationships of the network object 110*d* in bold since those have changed with respect to its relationships with the network object 110*d*.

Also, the graph representation 402 shows the cloud objects 140 and the network object 110*d* in shadow since they did exist in the representation 400 but do not exist in the representation 401 (e.g., and/or the topology information 228 for those representations).

The graph representation 402 also shows the time data of the network objects 110*c* and 110*e* in bold since those have changed with respect to the metrics changing over time in metrics data from metrics sources 211, 212 and 214.

Displaying the representations 400, 401 and/or 402 may be selected using user the input 174, such as described herein. Notably, an indicator on the display 172 may be slid forward along a time bar including the period of time and subsequent period of time to show the representation 401 and/or 402 and the changes therein.

Creating and/or displaying the representations 400, 401 and/or 402 increases computer efficiency because it provides an efficient way of combining graph data with time dimension data and timeseries data for highly efficient access time for specific queries that are applicable for network management.

Figure 5:
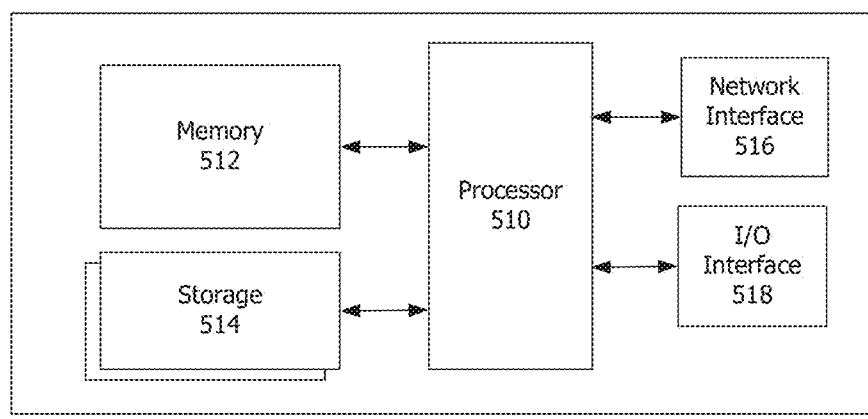
FIG. 5 is a block diagram of a computing device.

FIG. 5 is a block diagram of a computing device 500. The computing device 500 may be representative of the system 102, the I/O device 170, the server 130a, the object 120 and/or the object 130, herein. The computing device 500 may be a desktop or laptop computer, a server computer, a client computer, a network router, a network node, a network switch, a tablet, a smartphone or other mobile device. In some cases, it is a network object or element as described herein. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, a system of one or two physical network objects may provide displaying a graph representation of the topology information of network objects for a selected executing application.

The computing device 500 has a processor 510 coupled to a memory 512, storage 514, a network interface 516 and an I/O interface 518. The processor 510 may be or include one or more microprocessors, field programmable gate arrays (FPGAs), application specific integrated circuits (ASICs), programmable logic devices (PLDs) and programmable logic arrays (PLAs).

The memory 512 may be or include RAM, ROM, DRAM, SRAM and MRAM, and may include firmware, such as static data or fixed instructions, BIOS, system functions, configuration data, and other routines used during the operation of the computing device 500 and processor 510. The memory 512 also provides a storage area for data and instructions associated with applications and data handled by the processor 510. As used herein the term "memory" corresponds to the memory 512 and explicitly excludes transitory media such as signals or waveforms.

The storage 514 provides non-volatile, bulk or long-term storage of data or instructions in the computing device 500. It may be internal or external storage. The storage 514 may take the form of a magnetic or solid-state disk, tape, CD, DVD, or other reasonably high capacity addressable or serial storage medium. Multiple storage devices may be provided or available to the computing device 500. Some of these storage devices may be external to the computing device 500, such as network storage or cloud-based storage. As used herein, the terms "storage" and "storage medium" correspond to the storage 514 and explicitly exclude transitory media such as signals or waveforms. In some cases, such as those involving solid-state memory devices, the memory 512 and storage 514 may be a single device.

The network interface 516 includes an interface to a network such as a network that can be used to communicate calls, signals, streams, arrays, flagged samples and feedback described herein. The network interface 516 may be wired or wireless.

The I/O interface 518 interfaces the processor 510 to peripherals (not shown) such as displays, video and still cameras, microphones, keyboards and USB devices.

In some cases, storage 514 is a non-volatile machine-readable storage medium that includes all types of computer readable media, including magnetic storage media, optical storage media, and solid-state storage media. It should be understood that the software can be installed in and sold with the system 102, the object 120 and/or the object 130. Alternatively, the software can be obtained and loaded into the system 102, the object 120 and/or the object 130, including obtaining the software via a disc medium or from any manner of network or distribution system, including from a server owned by the software creator or from a server not owned but used by the software creator. The software can be stored on a server for distribution over the Internet.

Some technologies described for the system 102, the object 120 and/or the object 130 may include numerous units including a collector unit for selecting a portion of a set of data messages being or that have been sent over a period of time by an application executing on a selected physical network object of the plurality of physical network objects; and for collecting network configuration information and time dimension (CTD) information, and timeseries (TS) information for the portion of data messages from source units. The source units may include a metrics source unit for detecting metrics and timeseries data of the network objects; a configuration source unit for detecting the unique keys, IP addresses, configuration information of the network objects and for detecting the types of objects of the network objects; a flow log source unit for detecting IP addresses of the network objects, types of relationships between pairs of the network objects and for detecting the time dimension data for the network objects; and the configuration source and flow log source unit for obtaining IP addresses and/or unique keys of network objects not identified in data messages based on the type of the network object not identified in a first subset of data messages. The collector unit may also be for sending the collected network CTD and TS information to a time series processor unit and a connectivity processor unit. The time series processor unit and a connectivity processor unit may be for determining topology information of the physical network objects over the period of time based on the received/collected network configuration information and time dimension information. The topology information may include unique keys of the physical network objects, types of objects of the physical network objects, types of relationships between pairs of the physical network objects, time dimension data for the physical network objects and timeseries data of the network objects. The units may also include a data store unit for storing the topology information. The data store unit may also create and display a graph representation of the topology information.

The technologies described herein provide various technological improvements to computer performance and efficiently. For example, the system 102, the object 120, the object 130, the process 300, and/or the computing device 500 provide a much more accurate and efficient device (and process) for displaying a graph representation of a topology over time for an application executing on a computer communication network. For example, the technologies described are technological improvements over those of the past because they can accurately, automatically and continually over time, discover topology information and display graph representations of the topology for an application executing on a computer communication network by: selecting to collect network configuration information and time dimension (CTD) information, and timeseries (TS) information from only a portion of a set of data messages being sent over a period of time by a selected application executing on a network object of a computer network and possibly other network objects having a relationship with the selected application; determining topology information of the physical network objects over the period of time based on the collected network CTD and TS information; and displaying a graph representation of the topology information as it changes over time that includes unique keys of the physical network objects, types of objects of the physical network objects, types of relationships between pairs of the physical network objects, time dimension data for the physical network objects and timeseries data of the network objects. Prior technologies do have such improvements.

More particularly, the technologies described provide computer network topology mapping tools, systems and/or devices that automatically discover the topology of network objects of a network communicating with a selected application at a large scale, store the topology and allow quick access to the topology information in a graphic display. The technologies described provide a graph representation of the topology that mixes data that is not pure graphical and data that has a time dimension.

Within this description, the term "engine" means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic devices (PLD), or a programmable logic arrays (PLA). The gate netlist or other physical description may be converted into process instructions and masks for fabricating the engine within an application specific integrated circuit (ASIC).

Within this description, the term "unit" also means a collection of hardware, firmware, and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 516, or within a common FPGA, ASIC, or other circuit device.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The system 102, the object 120 and/or the object 130 may include a comparator unit and/or a model unit. These units may be hardware, software, firmware, or a combination thereof. Additional and fewer units, modules or other arrangement of software, hardware and data structures may be used to achieve the processes and apparatuses described herein.

CLOSING COMMENTS

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising a non-volatile machine readable medium storing a program having instructions which when executed by a processor will cause the processor to create and display a graph representation of topology information of a computer network, the instructions of the program performing computer functions of:

A) at least one network object for determining topology information of network objects of the computer network based on collected network configuration information and time dimension information of at least one application executing on at least one network object of the network; the topology information including unique keys of the network objects, types of objects of the network objects, types of relationships between pairs of the network objects, time dimension data for the network objects and timeseries data for each of the network objects;

wherein determining the topology information includes automatically grouping network objects having a common function into cluster subsets and service subsets; and wherein the automatically grouping includes creating a number of abstraction layers by interpreting low level relations between pairs of the network objects and collapsing functional groups of the network objects into higher level macro-components; and wherein some of the higher level macro-component have rolled-up values, key performance indicators (KPI) and timeseries data of internal components;

B) a user input/output device for receiving from a user a combined query to combine in the graph representation, only customizing requested ones of the unique keys of the network objects, only customizing requested ones of the types of objects of the network objects which include hosts and disks, only customizing requested ones of the types of relationships between pairs of the network objects which include a network object controlling actions performed by another network object, a network object communication with another network object, a network object depending on another network object in order to operate correctly, and a network object streaming data to another network object, only customizing requested ones of the timeseries data which includes critical metric data information for each of the network objects of the topology information;

C) a data store for:

creating a graph representation of the topology information including a map showing a representation of each network object for the requested unique key, the requested types of objects of each network object, the requested types of relationships between each pair of the network objects, and requested time dimension data for each of the network objects based on the collected network configuration information, and b) requested timeseries data for each of the network objects based on the collected time dimension information; and displaying the graph representation on a display;

wherein the data store includes:

a rich query language having:

a data model that contains graph information, measurements, time dimension information and timeseries data for the topology information; and the user input/output device for posing questions to the user related to time dimension information and timeseries data for the topology information for combining in the display.

2. The system of claim 1, the instructions of the program further performing computer functions of:

the data store for identifying changes in the topology information during based on the time dimension data;

the user input/output device for receiving from the user a selection to display on the display further graph representations for various points in time during; and the data store for creating and displaying on the display the further graph representations.

3. The system of claim 1, the instructions of the program further performing computer functions of:

the data store for identifying changes in the topology information over timebased on the time dimension data;

the user input/output device for receiving from the user a selection to display on the display a further graph representation of the changes between the topology information; and the data store for creating and displaying on the display the further graph representation.

4. The system of claim 1, wherein:

the time dimension information includes metric data for each network object;

the instructions of the program further performing computer functions of the data store for determining if critical metric data is missing for any of the network objects based on the metric data information; and the data store for creating and displaying on the display that critical metric data is missing for any of the network objects.

5. The system of claim 1, wherein the at least one network object includes:

a connectivity processor for:

determining the unique keys of the network objects, the types of objects of the network objects, and the types of relationships between pairs of the network objects, and time dimension data for the network objects based on the collected network configuration information; and a time series processor for determining the timeseries data for the network objects based on the collected time dimension information.

6. The system of claim 1, wherein the network objects comprise physical network objects and virtual network objects.

7. The system of claim 6, wherein the types of physical network objects include physical hosts, physical disks;

wherein the types of virtual network objects include logical clustered groups of resources, and logical services;

wherein the types of relationships include a network object controlling actions performed by another network object, a network object communication with another network object, a network object depending on another network object in order to operate correctly, and a network object streaming data to another network object;

wherein the time dimension information further includes critical metric data information for each network object, and wherein determining topology information includes determining if critical metric data is missing for any of the network objects based on the critical metric data information; and wherein displaying the graph representation includes displaying that the critical metric data is missing for any of the network objects.

8. A method of creating and displaying a graph representation of topology information of a computer network comprising:

A) determining topology information of network objects of the computer network based on collected network configuration information and time dimension information of at least one application executing on at least one network object of the network; the topology information including unique keys of the network objects, types of objects of the network objects, types of relationships between pairs of the network objects, time dimension data for the network objects and timeseries data for each of the network objects;
wherein determining the topology information includes automatically grouping network objects having a common function into cluster subsets and service subsets; and wherein the automatically grouping includes creating a number of abstraction layers by interpreting low level relations between pairs of the network objects and collapsing functional groups of the network objects into higher level macro-components; and wherein some of the higher level macro-component have rolled-up values, key performance indicators (KPI) and timeseries data of internal components;
B) receiving from a user a combined query to combine in the graph representation,
  only customizing requested ones of the unique keys of the network objects,
  only customizing requested ones of the types of objects of the network objects which include hosts and disks,
  only customizing requested ones of the types of relationships between pairs of the network objects which include a network object controlling actions performed by another network object, a network object communication with another network object, a network object depending on another network object in order to operate correctly, and a network object streaming data to another network object,
  only customizing requested ones of the timeseries data which includes critical metric data information for each of the network objects of the topology information;
C) creating a graph representation of the topology information including a map showing a representation of each network object for the requested unique key, the requested types of objects of each network object, the requested types of relationships between each pair of the network objects, and requested time dimension data for each of the network objects based on the collected network configuration information, and b) requested timeseries data for each of the network objects based on the collected time dimension information;
wherein creating the graph representation includes using a rich query language having:
  a data model that contains graph information, measurements, time dimension information and timeseries data for the topology information; and
  a user input/output device for posing questions to the user related to time dimension information and timeseries data for the topology information for combining in the display; and
D) displaying the graph representation on a display.

9. The method of claim 8, further comprising:
identifying changes in the topology information during based on the time dimension data;
receiving from the user a selection to display on the display further graph representations for various points in time during; and
creating and displaying on the display the further graph representations.

10. The method of claim 8, further comprising:
identifying changes in the topology information over time based on the time dimension data;
receiving from the user a selection to display on the display a further graph representation of the changes between the topology information; and
creating and displaying on the display the further graph representation.

11. The method of claim 8, wherein:
the time dimension information includes metric data for each network object;
creating the graph representation includes determining if critical metric data is missing for any of the network objects based on the metric data information; and
creating and displaying the graph representation includes displaying on the display that critical metric data is missing for any of the network objects.

12. The method of claim 8, further comprising:
selecting a period of time for the creating and displaying the graph representation based on a type of software of the application.

13. The method of claim 8, wherein the network objects comprise physical network objects and virtual network objects.

14. The method of claim 13, wherein creating a graph representation of the topology information includes using a graph database and graph database queries that integrate the unique keys of the network objects, types of objects of the network objects, types of relationships between pairs of the network objects.

15. The method of claim 13, wherein:
the network objects are the selected network object, network objects communicating with the selected network object using the application, and network objects having a relationship with the selected network object; and
the time dimension data of the map includes a periodic sequential series of the map.

16. The method of claim 13,
wherein the types of network objects include hosts, disks, logical clustered groups of resources, and logical services;
wherein the types of relationships include a network object controlling actions performed by another network object, a network object communication with another network object, a network object depending on another network object in order to operate correctly, and a network object streaming data to another network object; wherein the time dimension information further includes critical metric data information for each network object, and wherein determining topology information includes determining if critical metric data is missing for any of the network objects based on the critical metric data information; and
wherein displaying the graph representation includes displaying that the critical metric data is missing for any of the network objects.

* * * * *